(12) United States Patent  (10) Patent No.:  US 8,458,201 B2
Pollinger  (45) Date of Patent:  Jun. 4, 2013

(54) METHOD AND APPARATUS FOR MAPPING STRUCTURED QUERY LANGUAGE SCHEMA TO APPLICATION SPECIFIC BUSINESS OBJECTS IN AN INTEGRATED APPLICATION ENVIRONMENT

(75) Inventor: Thomas Pollinger, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1581 days.

(21) Appl. No.: 11/101,772

(22) Filed: Apr. 8, 2005

(65) Prior Publication Data

US 2006/0230063 A1  Oct. 12, 2006

(51) Int. Cl.
*G06F 17/30* (2006.01)
(52) U.S. Cl.
USPC ........... 707/756; 707/601; 707/602; 707/806; 707/807; 707/809
(58) Field of Classification Search
USPC ................. 707/601, 602, 806, 807, 809, 756, 707/793, 975, 4, 999.01, 999.101, 999.103–999.107
See application file for complete search history.

(56) References Cited

U.S. PATENT DOCUMENTS

| 5,542,078 | A  | * | 7/1996 | Martel et al. ................... 707/101 |
| 5,937,402 | A  |   | 8/1999 | Pandit |
| 6,256,676 | B1 | * | 7/2001 | Taylor et al. ................... 709/246 |
| 6,418,448 | B1 |   | 7/2002 | Sarkar |
| 6,571,232 | B1 | * | 5/2003 | Goldberg et al. ................ 707/2 |
| 6,591,260 | B1 |   | 7/2003 | Schwarzhoff et al. |
| 6,704,744 | B1 |   | 3/2004 | Williamson et al. .......... 707/103 |
| 6,732,095 | B1 |   | 5/2004 | Warshavsky et al. |
| 6,732,109 | B2 |   | 5/2004 | Lindberg et al. |
| 6,745,382 | B1 |   | 6/2004 | Zothner |
| 6,789,252 | B1 |   | 9/2004 | Burke et al. ................... 717/100 |
| 6,820,135 | B1 | * | 11/2004 | Dingman et al. ............. 709/246 |
| 6,850,893 | B2 |   | 2/2005 | Lipkin et al. |
| 6,912,538 | B2 |   | 6/2005 | Stapel et al. |
| 6,985,912 | B2 | * | 1/2006 | Mullins et al. ........................ 1/1 |
| 6,996,568 | B1 | * | 2/2006 | Bedell et al. .................. 707/100 |

(Continued)

FOREIGN PATENT DOCUMENTS

WO  WO/99/09494  * 2/1999

OTHER PUBLICATIONS

Cover page; copyright page; pp. 12, 27, 73, 74, 76, 77, 78, 80, 82, 103, 104, 199, 200, 244, 245 from: http://web.archive.org/web/20030411185500/http://www.altova.com/download/43/SpyManual43.pdf (published on Feb. 7, 2002) (archived on Apr. 11, 2003).*

(Continued)

*Primary Examiner* — Leslie Wong
(74) *Attorney, Agent, or Firm* — Yee & Associates, P.C.; Prentiss W. Johnson

(57) ABSTRACT

A method, an apparatus and computer instructions are provided for mapping structured query language (SQL) schema to application specific business objects in an integration application environment. A SQL business object application specific information (BO ASI) builder is added to the business object application specific information (BO ASI) resolver. When a SQL markup language schema is parsed by a schema resolver, meta business objects (BOs) are generated with schema annotations, and the BO ASI resolver locates the SQL BO ASI builder that is able to handle the meta BOs. The SQL BO ADI builder then fills the ASI fields of the meta BOs and returned to a BO writer, which writes out application specific business objects understandable by the integration server.

22 Claims, 9 Drawing Sheets

U.S. PATENT DOCUMENTS

| | | | |
|---|---|---|---|
| 7,007,033 | B1 | 2/2006 | Rothschiller et al. |
| 7,017,112 | B2 | 3/2006 | Collie et al. |
| 7,031,956 | B1 | 4/2006 | Lee et al. |
| 7,039,875 | B2 | 5/2006 | Khalfay et al. |
| 7,096,224 | B2 | 8/2006 | Murthy et al. |
| 7,130,842 | B2 | 10/2006 | Lynch et al. |
| 7,146,399 | B2 * | 12/2006 | Fox et al. ............... 709/203 |
| 7,152,073 | B2 * | 12/2006 | Gudbjartsson et al. ....... 707/102 |
| 7,188,114 | B2 | 3/2007 | Liu et al. |
| 7,194,485 | B2 | 3/2007 | Kaipa et al. |
| 7,194,733 | B2 | 3/2007 | Ringseth et al. |
| 7,334,002 | B2 | 2/2008 | Byrne |
| 7,350,191 | B1 * | 3/2008 | Kompella et al. ........... 717/108 |
| 7,366,821 | B2 | 4/2008 | Fukaishi et al. |
| 7,370,028 | B2 * | 5/2008 | Doughan ................... 1/1 |
| 7,386,562 | B2 | 6/2008 | Long |
| 7,406,474 | B2 | 7/2008 | Musteata et al. |
| 7,418,456 | B2 | 8/2008 | Charlet et al. |
| 7,434,227 | B2 | 10/2008 | Scheinkman |
| 7,490,093 | B2 | 2/2009 | Jain et al. |
| 7,496,927 | B2 | 2/2009 | Hammer et al. |
| 7,516,229 | B2 | 4/2009 | Trastour et al. |
| 7,516,447 | B2 | 4/2009 | Marvin et al. |
| 7,533,386 | B2 | 5/2009 | Coker et al. |
| 7,587,447 | B2 | 9/2009 | Ryman |
| 7,590,644 | B2 | 9/2009 | Matsakis et al. |
| 7,596,622 | B2 | 9/2009 | Owen et al. |
| 7,693,955 | B2 | 4/2010 | Karakashian |
| 7,743,162 | B2 | 6/2010 | Matsushima |
| 7,779,386 | B2 | 8/2010 | Seitz et al. |
| 7,788,278 | B2 | 8/2010 | Cheng et al. |
| 7,836,063 | B2 | 11/2010 | Salazar et al. |
| 7,877,421 | B2 * | 1/2011 | Berger et al. ............. 707/809 |
| 7,930,293 | B2 * | 4/2011 | Fox et al. ............... 707/713 |
| 7,962,925 | B2 | 6/2011 | Fry et al. |
| 8,041,760 | B2 * | 10/2011 | Mamou et al. ............. 709/200 |
| 8,145,653 | B2 | 3/2012 | Kosov et al. |
| 2002/0063734 | A1 | 5/2002 | Khalfay et al. |
| 2002/0107889 | A1 | 8/2002 | Stone et al. |
| 2002/0120859 | A1 | 8/2002 | Lipkin et al. |
| 2002/0147606 | A1 | 10/2002 | Hoffmann et al. |
| 2003/0023604 | A1 | 1/2003 | O'Brien et al. |
| 2003/0028540 | A1 | 2/2003 | Lindberg et al. |
| 2003/0065533 | A1 | 4/2003 | Scheinkman |
| 2003/0097383 | A1 | 5/2003 | Smirnov et al. |
| 2003/0120665 | A1 * | 6/2003 | Fox et al. ............... 707/100 |
| 2003/0135825 | A1 | 7/2003 | Gertner et al. |
| 2003/0163606 | A1 | 8/2003 | Fukaishi et al. |
| 2003/0167358 | A1 | 9/2003 | Marvin et al. |
| 2003/0167456 | A1 | 9/2003 | Sabharwal |
| 2003/0182364 | A1 | 9/2003 | Large et al. |
| 2003/0195762 | A1 | 10/2003 | Gleason et al. |
| 2003/0204481 | A1 | 10/2003 | Lau |
| 2003/0217044 | A1 | 11/2003 | Zhang et al. |
| 2003/0229665 | A1 | 12/2003 | Ryman |
| 2004/0045005 | A1 | 3/2004 | Karakashian |
| 2004/0054969 | A1 | 3/2004 | Chiang et al. |
| 2004/0064804 | A1 | 4/2004 | Daniels et al. |
| 2004/0073870 | A1 | 4/2004 | Fuh et al. |
| 2004/0078802 | A1 | 4/2004 | Hammer et al. |
| 2004/0093344 | A1 | 5/2004 | Berger et al. |
| 2004/0111525 | A1 | 6/2004 | Berkland et al. |
| 2004/0111533 | A1 | 6/2004 | Beisiegel et al. |
| 2004/0123048 | A1 | 6/2004 | Mullins et al. |
| 2004/0133445 | A1 | 7/2004 | Rajan et al. |
| 2004/0133580 | A1 | 7/2004 | Liu et al. |
| 2004/0139095 | A1 | 7/2004 | Trastour et al. |
| 2004/0148612 | A1 | 7/2004 | Olsen |
| 2004/0167894 | A1 | 8/2004 | Ziv |
| 2004/0168124 | A1 | 8/2004 | Beisiegel et al. |
| 2004/0194016 | A1 | 9/2004 | Liggitt |
| 2004/0216030 | A1 * | 10/2004 | Hellman et al. ........... 715/500 |
| 2005/0060647 | A1 | 3/2005 | Doan et al. |
| 2005/0144087 | A1 | 6/2005 | Huang et al. |
| 2005/0149552 | A1 | 7/2005 | Chan et al. |
| 2005/0257193 | A1 * | 11/2005 | Falk et al. ............... 717/109 |
| 2005/0278358 | A1 | 12/2005 | Doughan |
| 2006/0009991 | A1 | 1/2006 | Jeng et al. |
| 2006/0064667 | A1 | 3/2006 | Freitas |
| 2006/0230048 | A1 * | 10/2006 | Kosov et al. ............... 707/100 |
| 2006/0230057 | A1 | 10/2006 | Kosov et al. |
| 2006/0230063 | A1 | 10/2006 | Pollinger |
| 2006/0230066 | A1 | 10/2006 | Kosov et al. |
| 2008/0208660 | A1 | 8/2008 | Kano et al. |

OTHER PUBLICATIONS

Pages 2, 6, 10, 30, 63, 115, 190, 334-337, 354, 358, and 503 from: http://web.archive.org/web/20030411185500/http://www.altova.com/download/43/SpyManual43.pdf (published on Feb. 7, 2002) (archived on Apr. 11, 2003).*

XMLSPY (published on Feb. 7, 2002) (archived on Apr. 11, 2003) at: http://web.archive.org/web/20030411185500/http://www.altova.com/download/43/SpyManual43.pdf.*

Kahm, "Using WebSphere Studio Asset Analyzer", ibm.com/redbooks, 2004, pp. 1-34.

Connor et al., "IBM WebSphere Studio Asset Analyzer: Overview", IBM Corp., Jun. 2001, pp. 1-10.

Amagasa et al., "Realizing Temporal XML Repositories using Temporal Relational Databases*", Graduate School of Information Science, Nara Institute of Science and Technology, 2001, pp. 60-64.

Trad et al., Building a XML Based Object Mapping System (OMS), Proceedings of the 23$^{rd}$ International Conference on Information Technology Interfaces, http://www.srce.hr/iti, ISBM 953-96769-3-2, Pula, Croatia, Jun. 19-22, 2007, 7 pages.

Ha et al., "Mapping XML Documents to the Object-Relational Form*", ISIE 2001, 2001 IEEE International Symposium on Industrial Electronics Proceedings, Paradise Hotel, Pusan, Korea, vol. III. Jul. 12-16, 2001, pp. 1757-1761.

Kosov et al., Using Schemas to Generate Application Specific Business Objects for Use in an Integration Broker, Apr. 8, 2005.

Final office action dated Jan. 19, 2011 regarding U.S. Appl. No. 11/102,025, 35 pages.

Final office action dated Jan. 26, 2009 regarding U.S. Appl. No. 11/102,025, 24 pages.

Final office action dated Dec. 21, 2007 regarding U.S. Appl. No. 11/102,025, 16 pages.

Non-final office action dated Jun. 1, 2011 regarding U.S. Appl. No. 11/102,025, 37 pages.

Non-final office action dated Jul. 10, 2008 regarding U.S. Appl. No. 11/102,025, 33 pages.

Final office action dated Jul. 21, 2009 regarding U.S. Appl. No. 11/102,025, 19 pages.

Non-final office action dated Jun. 25, 2007 regarding U.S. Appl. No. 11/102,025, 15 pages.

Non-final office action dated Aug. 18, 2010 regarding U.S. Appl. No. 11/102,025, 37 pages.

Notice of allowance dated Nov. 16, 2011 regarding U.S. Appl. No. 11/102,025, 7 pages.

Final office action dated Jan. 11, 2008 regarding U.S. Appl. No. 11/101,773, 19 pages.

Non-final office action dated Jun. 27, 2007 regarding U.S. Appl. No. 11/101,773, 18 pages.

Final office action dated Nov. 10, 2009 regarding U.S. Appl. No. 11/101,867, 13 pages.

Final office action dated Dec. 22, 2008 regarding U.S. Appl. No. 11/101,867, 17 pages.

Non-final office action dated May 15, 2009 regarding U.S. Appl. No. 11/101,867, 16 pages.

Non-final office action dated May 21, 2008 regarding U.S. Appl. No. 11/101,867, 27 pages.

Non-final office action dated Jul. 27, 2007 regarding U.S. Appl. No. 11/101,867, 17 pages.

Kosov et al., "Method and Apparatus for Mapping Web Services Definition Language Files to Application Specific Business Objects in an Integrated Application Environment," filing date Apr. 8, 2005, 45 pages.

Kosov et al., "Method and Apparatus for Object Discovery Agent Based Mapping of Application Specific Markup Language Schemas to Application Specific Business Objects in an Integrated Application Environment," filing date Apr. 8, 2005, 45 pages.

Rivero et al. "Elicitation and Conversion of Hidden Objects and Restrictions in a Database Schema", Mar. 2002, ACM, pp. 463-469.

* cited by examiner

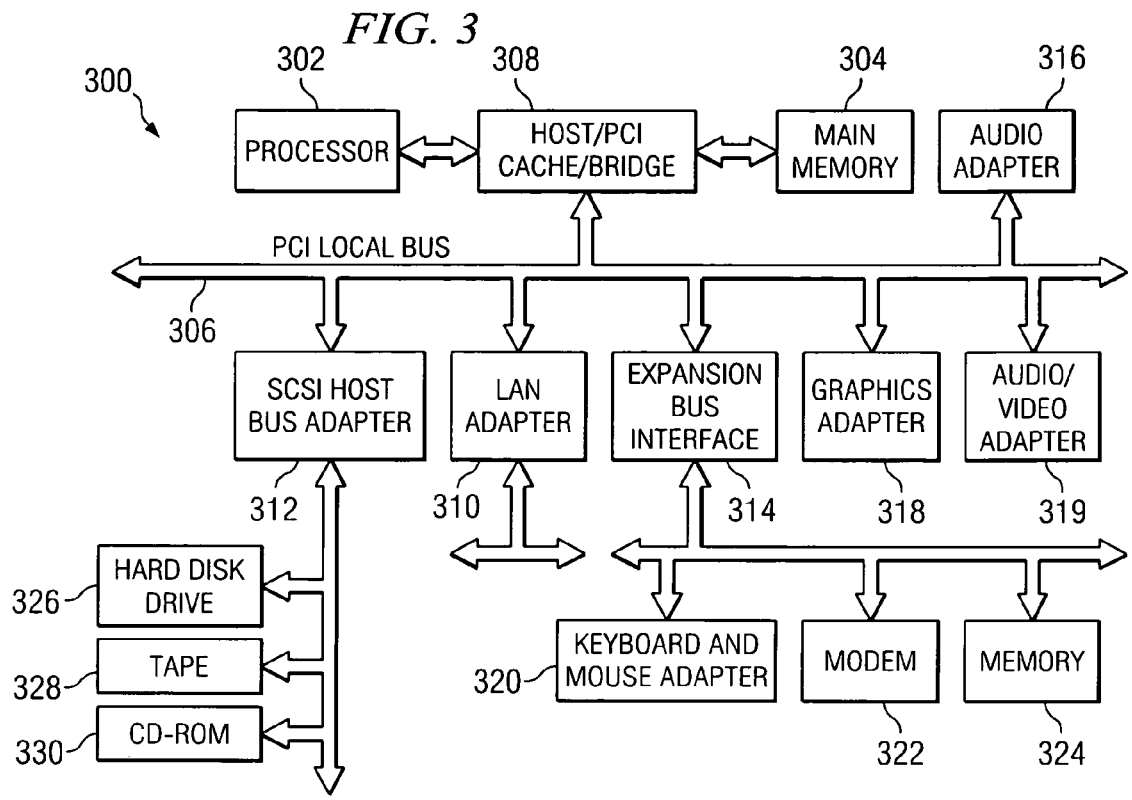
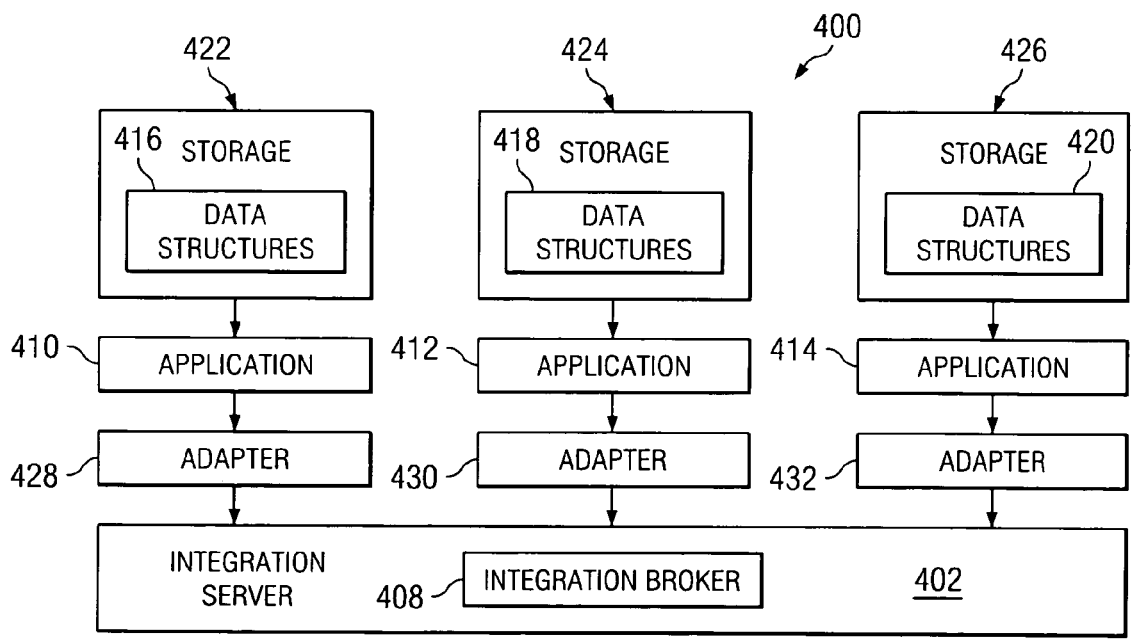

```
<schema xmlns:xs="http://www.w3.org/2001/XMLSchema">              800
    <xs:complexType name="PERSON_T">  ~808
        <xs:sequence>
            <xs:element name="ID" type="xs:interger"/>  ~810
            <xs:element name="FIRST_NAME" type="xs:string"/>  ~812
            <xs:element name="LAST_NAME" type="xs:string/>  ~814
            <xs:element name="DOB" type="xs:date"/>  ~816
        </xs:sequence>
    </xs:complexType>
    <xs:complexType name="CONTACT_T">  ~818
        <xs:sequence>
            <xs:element name="ID" type="xs:integer"/>
            <xs:element name="TYPE" type="xs:string"/>
            <xs:element name="DETAIL" type="xs:string"/>
            <xs:element name="PERSON_ID" type="PERSON_T"/>
        </xs:sequence>                \
    </xs:complexType>                 820
    <xs:complexType name="ADDRESS_T">
        <xs:sequence>
            <xs:element name="ID" type="xs:integer"/>
                           .
                           .
                           .
            <xs:element name="PERSON_ID" type="PERSON_T"/>
        </xs:sequence>
    </xs:complexType>

<xs:element name="PERSON" type="PERSON_T"/>  ~802
    <xs:element name="CONTACT" type="CONTACT_T"/>  ~804
    <xs:element name="ADDRESS" type="ADDRESS_T"/>  ~806
822~
    <xs:key name="personKey">
        <xs:selector xpath="/PERSON"/>
        <xs:field xpath="ID"/>
    </xs:key>
824~ <xs:keyref name=addressPersonKey" refer="personKey">
        <xs:selector xpath="/ADDRESS"/>
        <xs:field xpath="PERSON_ID"/>
    </xs:keyref>
    <xs:keyref name=contactPersonKey" refer="contactKey">
        <xs:selector xpath="/CONTACT"/>
        <xs:field xpath="PERSON_ID"/>
    </xs:keyref>
</schema>
```

*FIG. 8*

```
<schema xmlns:xs="http://www.w3.org/2001/XMLSchema" xmlns:xyz="http:// www.xyz-
database.org/2004/schema"...>
    <xs:complexType name="PersonType">   1102   1104
        <xs:sequence>
            <xs:element name="id" xyz:column="ID" type="xs:integer"/>
            <xs:element name="first" xyz:column="FIRST_NAME" type="xs:string"/>
            <xs:element name="last" xyz:column="LAST_NAME" type="xs:string"/>
            <xs:element name="dob" xyz:column="DOB"
                    xyz:type="DATE" type="xs:date"/>     1106
        </xs:sequence>                              1108
    </xs:complexType>

<xs:element name="Person" type="PersonType" xyz:table="PERSON"/>
</schema>
```
1100

FIG. 11

```
<schema xmlns:xs="http://www.w3.org/2001/XMLSchema">                   1200
    <xs:complexType name="PersonType">     1204
        <xs:sequence>               1202
            <xs:annotation><xs:appinfo column="ID"/></xs:annotation>
            <xs:element name="id" type="xs:integer"/>
            <xs:annotation><xs:appinfo column="FIRST_NAME"/></xs:annotation>
            <xs:element name="first" type="xs:string"/>
            <xs:annotation><xs:appinfo column="LAST_NAME"/></xs:annotation>
            <xs:element name="last" type="xs:string"/>
            <xs:annotation><xs:appinfo column="DOB"/></xs:annotation>
            <xs:element name="dob" type="xs:date"/>
        </xs:sequence>
    </xs:complexType>

<xs:annotation><xs:appinfo table="PERSON"/></xs:annotation>
    <xs:element name="Person" type="PersonType"/>
</schema>
```

FIG. 12

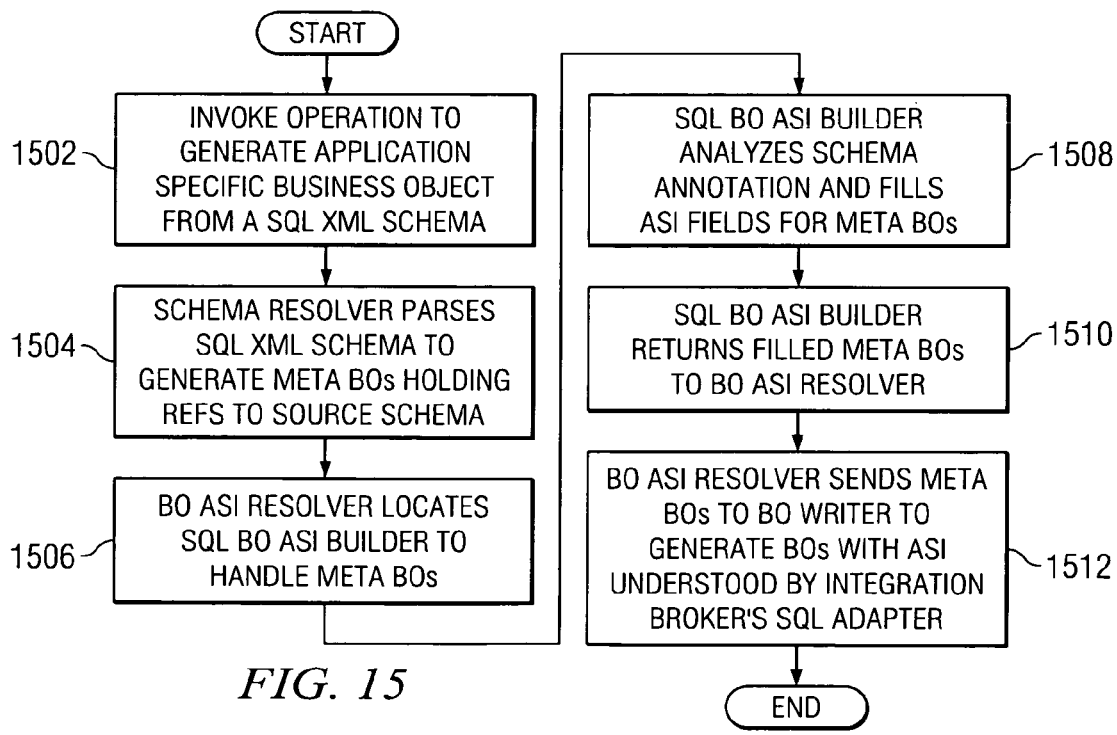

METHOD AND APPARATUS FOR MAPPING STRUCTURED QUERY LANGUAGE SCHEMA TO APPLICATION SPECIFIC BUSINESS OBJECTS IN AN INTEGRATED APPLICATION ENVIRONMENT

CROSS-REFERENCE TO RELATED APPLICATIONS

The present invention is related to the following application entitled Using Schemas to Generate Application Specific Business Objects for Use in an Integration Broker, Ser. No. 11/102,025, filed on Jul. Apr. 8, 2005.

BACKGROUND OF THE INVENTION

1. Technical Field

The present invention relates to an improved network data processing system. In particular, the present invention relates to an integrated application environment in a network data processing system. Still more particular, the present invention relates to mapping structured query language schema to application specific business objects in an integrated application environment.

2. Description of Related Art

In an integrated application environment, an integration server integrates different types of applications and shares business objects among these applications. An exemplary type of application is a structured query language (SQL) compliant application. Typically, SQL compliant applications are specific database applications, such as Oracle, a product available from Oracle Corporation.

When integrating SQL compliant applications into an integration broker, the SQL table structures need to be accessible, such that artifacts may be generated to abstract table structures. One way is to directly access the database with a JDBC compliant driver. By using the JDBC compliant driver, JDBC ODA can generate the artifacts. With the increasing popularity of extensible markup language (XML), table structures may be expressed in XML schemas, where a physical database connection is no longer needed. To generate artifacts from XML schemas, two major approaches have been taken.

One approach is by using an extensible markup language (XML) object discovery agent (ODA). XML ODA reads XML schemas and document type definitions (DTDs) for each table in the database and generates business objects when the database tables are not known or not readily available. After business objects are generated, the user has to manually edit all the application specific information (ASI) fields of the business objects to match the database application adapter expected information, for example, table name, column table, etc. Application specific information fields provides mapping of business object fields to corresponding field in the application specific data structure of the database application. This approach requires a fair amount of manual efforts to correct the ASI fields in the generated business objects.

A second approach is by using a database adapter ODA, such as a JDBC ODA, to directly draw definitions of database tables and relationship and generate business objects from these definitions when the database tables are known. Possible edits may be required to match deviations between the generated business objects and the XML schemas. In this approach, a database connection is necessary in order to access the database for creating the business objects.

While these approaches attempt to alleviate some problems of integrating XML schemas, significant manual efforts are required to fine tune the business objects in order to meet the database applications' expected information. In addition, these approaches fail to accommodate the variety of XML schemas annotated with relationships to the database tables and columns. Furthermore, there is no existing mechanism that accommodates database application version or vendor changes.

Therefore, it would be advantageous to have an improved method, apparatus, and computer instructions for mapping SQL schema to application specific business objects to be understood by integration broker, such that SQL schemas may be imported into the integration server regardless of the variety of schema annotations or database application version and vendor changes.

SUMMARY OF THE INVENTION

The present invention provides a method, an apparatus, and computer instructions for mapping structured query language schema to application specific business objects in an integration application environment. The present invention detects a structured query language schema and generates a set of meta business objects from the schema, which includes metadata of the schema.

From a set of registered business object application specific builders, the present invention identifies a business object application specific information builder for the set of meta business objects and populates a set of application specific information fields for the set of meta business objects based on the metadata of the schema.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a diagram illustrating an integrated application environment in accordance with an illustrative embodiment of the present invention;

FIG. 8 is a diagram illustrating an exemplary XML schema format for representing database table definition, such as database table definition 700 in FIG. 7, using XML elements and attribute naming in accordance with an illustrative embodiment of the present invention;

FIG. 11 is a diagram illustrating an exemplary XML schema format for representing database table definition, such as database table definition 700 in FIG. 7, using schema extension types in accordance with an illustrative embodiment of the present invention;

FIG. 12 is a diagram illustrating an exemplary XML schema format for representing database table definition, such as database table definition 700 in FIG. 7, using schema appinfo annotation in accordance with an illustrative embodiment of the present invention;

FIG. 13 is a diagram illustrating an exemplary XML schema format for representing database table definition, such as database table definition 700 in FIG. 7, using schema comment annotation in accordance with an illustrative embodiment of the present invention;

FIG. 15 is a flowchart of an exemplary process of mapping SQL XML schema to application specific business objects in accordance with an illustrative embodiment of the present invention.

DETAILED DESCRIPTION OF THE PREFERRED EMBODIMENT

Figure 1:
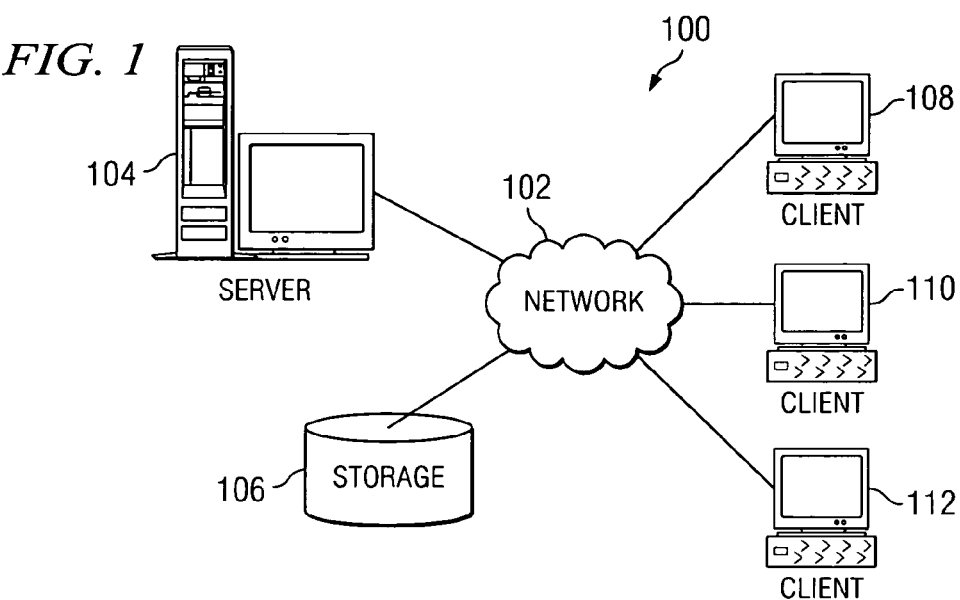
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
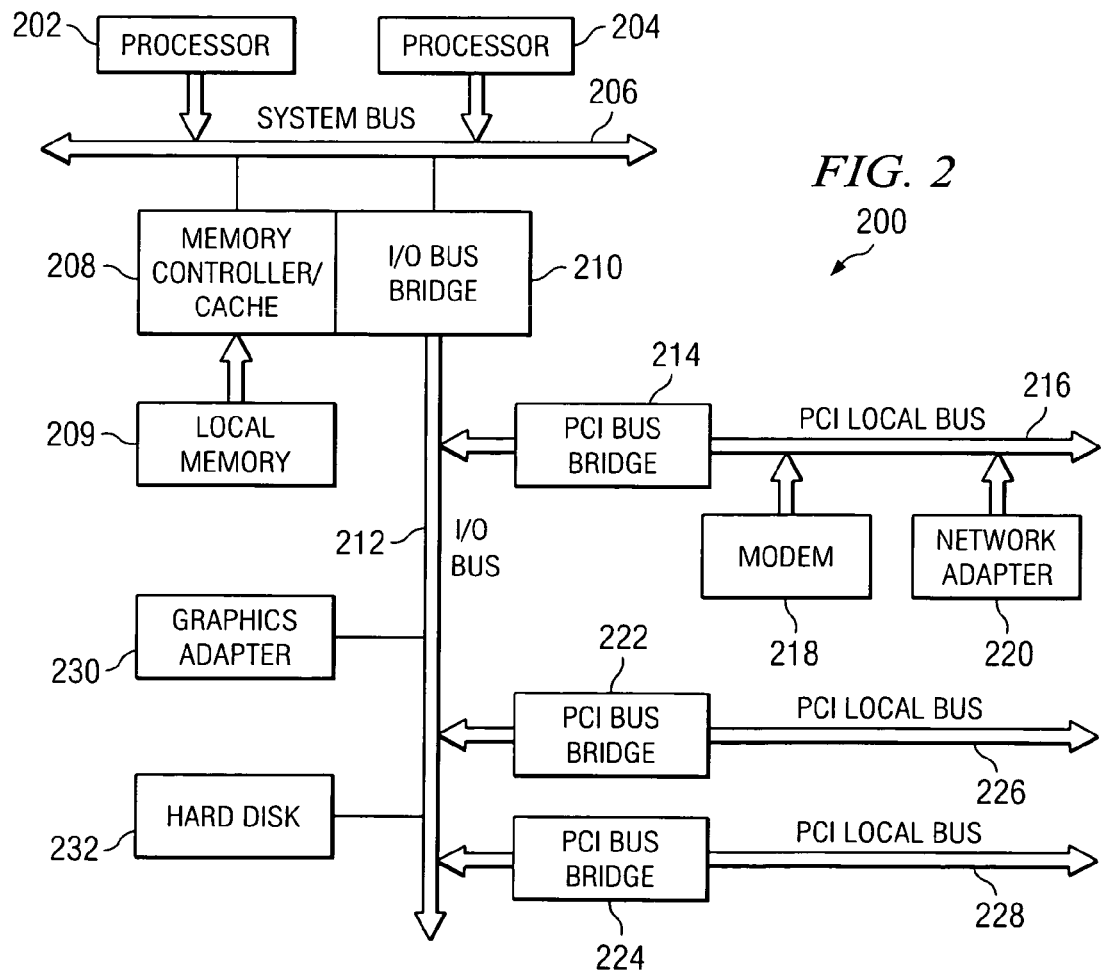
FIG. 2 is a block diagram of a data processing system that may be implemented as a server in accordance with an illustrative embodiment of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. Memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object-oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand-held computer in addition to taking the form of a PDA. Data processing system 300 also may be a kiosk or a Web appliance.

As described in related patent application, entitled "Using Schemas to Generate Application Specific Business Objects for Use in an Integration Broker," incorporated by reference above, when a source application wants to communicate with a destination application in an integrated application environment, adapters are used to transform data in the source format to the destination format. Specifically, an adapter of the source application may convert proprietary data or application specific business objects to generic business objects understood by the integrated environment. Business objects are containers that hold fields of any type.

Business object fields may include a field type, a field name, and a field ASI. Field name indicates the name of the field, such as street. Field type indicates a type of the field, for example, a string, an integer, or a long. Field ASI is typically empty if the business object is a generic business object or it may hold information for its matching application adapter. A user may also include comments for each field to indicate status, such as whether the field is a foreign key, a key, a default value, or whether the field may be null or not. An instance of the business object definition holds instance values that conform to the type defined in the business object definition.

Upon receiving the generic business objects, an adapter of the destination application may convert the generic business objects back to application specific business objects for the destination application. In this way, collaboration may be achieved between the source and destination applications, since adapters normalize their underlying application.

Turning now to FIG. 4, a diagram illustrating an integrated application environment is depicted in accordance with an illustrative embodiment of the present invention. As depicted in FIG. 4, integration application environment 400 includes integration server 402. Integration server 402 may be implemented as data processing system 200 in FIG. 2.

Integration server 402 includes integration broker 408, which provides services for transfer of data in application specific business objects among applications 410, 412, and 414. Applications 410, 412, and 414 are clients for integration broker 402 and maintain data in application specific data structures 416, 418, and 420 respectively. Application specific data structures 416, 418, and 420 may reside in vendor specific databases, such as storage 422, 424, and 426, or tied to an application that may not have storage attached.

When a source application, such as application 410, receives a new customer address, adapter 428 reads the customer with the new customer address and transforms it into an application specific business object. Adapter 428 then sends the application specific business object to integration broker 408. Integration broker 408 includes a map that maps the application specific business object into a generic business object, which represents relevant parts of the customer field in a normalized way.

The generic business object does not have any application specific information fields and is used in generic collaborations, while the application specific business object looks structurally the same as the generic business object, but with ASI fields initialized to work with adapter 428. Adapter 428 transforms application specific business objects to a format understood by application 410. Examples of formats include XML, database SQL queries, IDOC, BAPI for SAP, simple output text files, or direct connection to a third-party vendor application programming interface.

A collaboration mechanism within integration broker 408 that provides synchronization between the source adapter and the target adapter accepts the generic business object and sends an update request to target adapter 430 of target application 412.

Before returning the object to target adapter 430, integration broker 408 maps the generic object into the target application specific business object. Once the application specific business object is received by target adapter 430, target adapter 430 sends the updated address information in the target application's format to target application 412.

While, in this illustrative embodiment, three adapters are provided to transfer data between data structures, any number of additional adapters may be provided to transfer data between additional data structures without departing the spirit and scope of the present invention. In addition, adapters may be implemented as a standalone adapter or tied to a target application that may not have a storage device attached. An example of a standalone adapter is a source adapter, which reads temperature from a measuring device. An example of an adapter tied to a target application is a front end that is tied to some other application.

Figure 5:
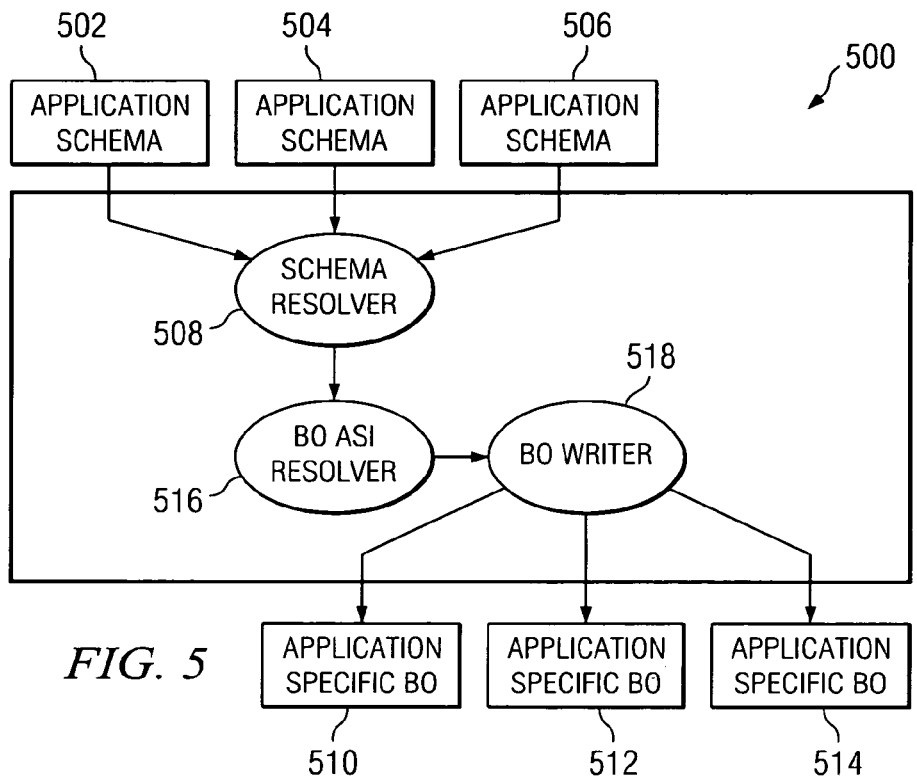
FIG. 5 is a diagram illustrating a generic framework for reading markup language schemas to form business objects in accordance with an illustrative embodiment of the present invention.

Turning now to FIG. 5, a diagram illustrating a generic framework for reading markup language schemas to form business objects is depicted in accordance with an illustrative embodiment of the present invention. As depicted in FIG. 5, in integration broker 500, application markup language schemas 502, 504, and 506 may be provided to define the structure and formats of application specific data structures, such as data structures 416, 418, and 420 in FIG. 4.

Schemas 502, 504, and 506 are parsed by schema resolver 508 to generate base structures for application specific business objects 510, 512, and 514. These base structures are known as meta business objects (BOs). Meta BOs hold information for the application specific business objects 510, 512, 514, as well as references to the original source schemas 502, 504, and 506. Schemas 502, 504, and 506 are then interpreted by business object ASI resolver 516 to populate application specific information (ASI) fields of the application specific business objects 510, 512, and 514. ASI fields provide information necessary to configure the target application. For example, in case of a target database application, ASI fields may include the database name, table names, and column names.

If BO ASI resolver 516 is able to populate the ASI fields, BO ASI resolver 516 populates the ASI fields and passes the application specific business objects 510, 512, and 514 to business object writer 518. BO writer writes out the business objects with ASI fields. BO ASI resolver 516 may also be extended to plug in additional specific ASI builders that are able to interpret a particular form of schema definition. More detail regarding the extension of BO ASI builder 516 is discussed in FIG. 6.

The present invention provides a method, an apparatus, and computer instructions for mapping SQL XML schema to application specific business objects in an integrated application environment. In an illustrative embodiment, the present invention extends the functionality of the business object application specific information (BO ASI) resolver to plug in an additional business object application specific information (BO ASI) builder for SQL annotated schema.

When a SQL XML schema is provided to a schema resolver, the schema resolver parses the SQL XML schema and generates meta business objects (BOs) based on metadata of the schema. Meta BOs are object representations of the schema format. The meta BOs include all annotations, commons, names, rules, and other hierarchical information of the schema. The metadata of the schema includes annotations, elements, and attributes that represent database table names and database columns.

The schema resolver may accommodate any relational database schema format and may import any database table structures of any database vendors as long as the table structures are described by XML schemas. In addition, the pluggable nature of the schema resolver allows any format annotating the XML schema to relate to a particular database table structure. More detail regarding possible SQL annotation formats for XML schema is discussed in FIGS. 7-13. Once the meta BOs are generated, the BO ASI resolver locates registered BO ASI builders that are able to interpret particular forms of schema definitions and determines if a SQL BO ASI builder is present to handle the meta BOs.

In order to determine which of the registered BO ASI builders is capable of handling the meta BOs, the application type and version of the provided SQL XML schema are analyzed by the BO ASI resolver to determine if a registered BO ASI builder is able to interpret a given set of meta BOs with their annotated schema. The application type and version may be based on the target namespace of the schema, additional namespaces for adding schema type extensions, schema information, document annotations, etc. A classification of a given schema may be quickly determined using one of the above characteristics. However, in cases where none of the above characteristics are available, the BO ASI resolver may ask the registered BO ASI builder to perform an in-depth analysis of the schema structure in order to recognize patterns that would fit a particular form of schema definition.

Once the BO ASI resolver locates a SQL BO ASI builder to handle the meta BOs, the SQL BO ASI builder reads the meta BOs and analyzes schema annotations, documentation, and specific schema types, in order to build ASI fields for the particular schema. Since meta BOs expose the schema structure, the schema structure may be used to fine tune and populate the application specific information of BOs. Thus, the SQL BO ASI builder examines the particular schema and generates an intermediate representation of dependencies of the meta BOs including all the information necessary to create ASI fields of BOs. The SQL BO ASI builder then populates the ASI fields for the meta BOs that can be understood by SQL compliant application adapters. More detail regarding meta BO ASI fields is discussed in FIG. 14.

Once the ASI fields are populated, the SQL BO ASI builder sends the meta BOs to BO writer, which generates application specific business objects used by the integration broker. The application specific business objects only include database information, such as database name, table names, and column names, and not schema information.

Figure 6:
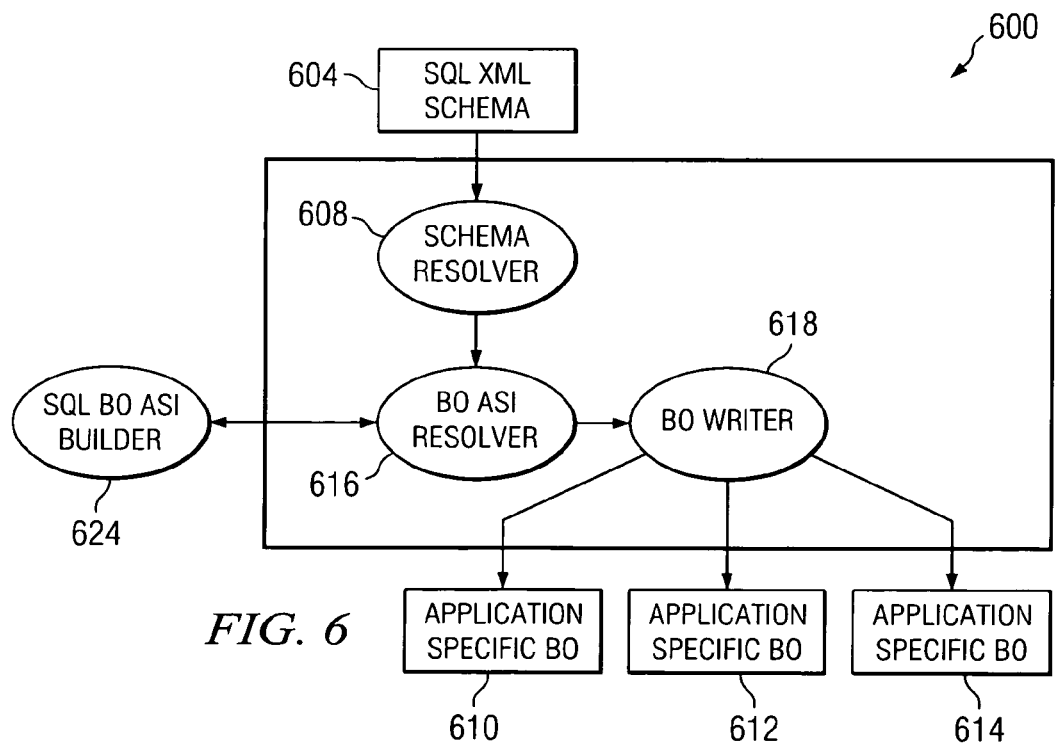
FIG. 6 is a diagram illustrating a generic framework for reading markup language schemas with added SQL ASI builder in accordance with an illustrative embodiment of the present invention.

Turning now to FIG. 6, a diagram for a generic framework for reading markup language schemas with added SQL ASI builder is depicted in accordance with an illustrative embodiment of the present invention. As depicted in FIG. 6, integration broker 600 is similar to integration broker 500 in FIG. 5, except that SQL BO ASI builder 624 is added to communication with BO ASI resolver 616.

When BO ASI resolver 616 receives SQL XML schema 604 from schema resolver 608, BO ASI resolver 616 locates SQL BO ASI builder 624 from its registered BO ASI builders, since SQL BO ASI builder 624 is able to handle the meta BOs generated from SQL BO ASI schema 604. It is noted that since SQL BO ASI builder 624 is pluggable in nature, different types of schemas and annotation formats from different vendors may also be accommodated by integration broker 500. Thus, if future changes of the database application lead to a change in SQL XML schema 604, a new BO SQL ASI builder may be added to the BO ASI resolver 616 to distinguish between different database versions and different vendors.

Figure 7:
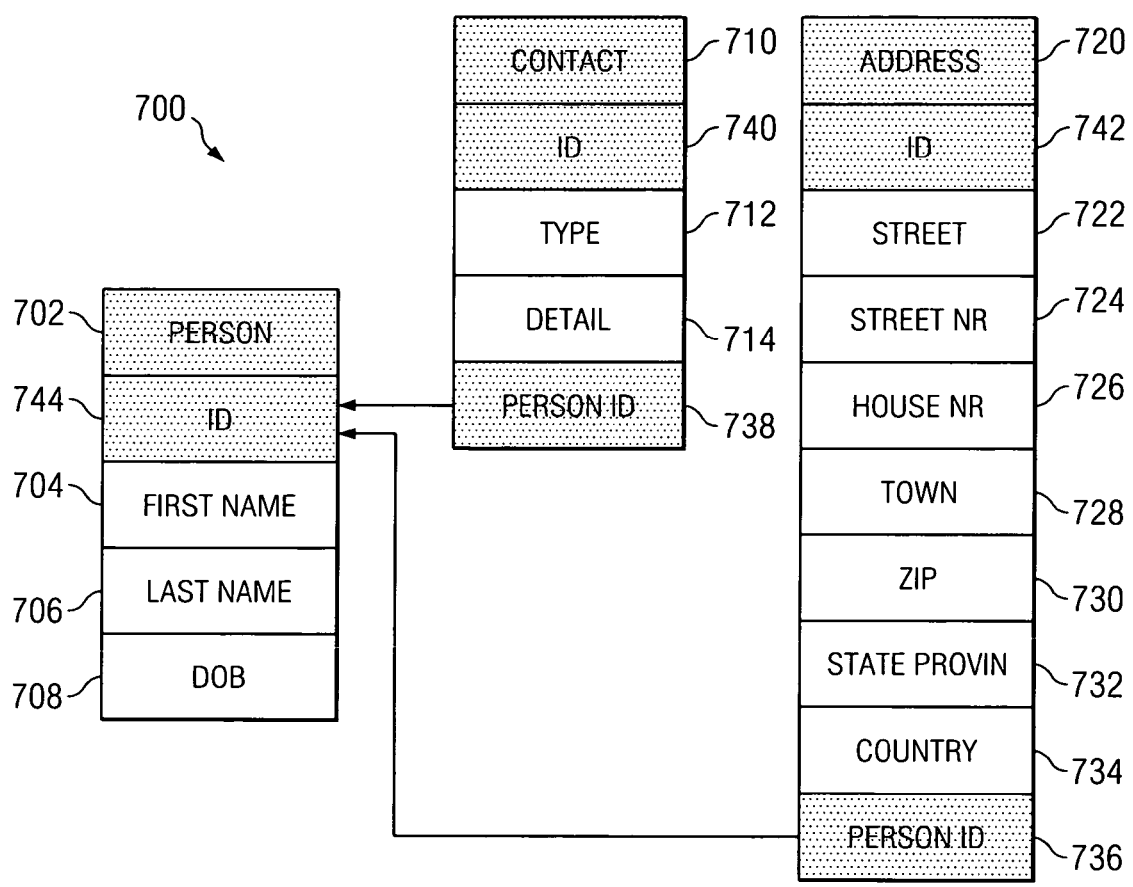
FIG. 7 is a diagram illustrating an exemplary database table definition in accordance with a preferred embodiment of the present invention.

Turning now to FIG. 7, a diagram illustrating an exemplary database table definition is depicted in accordance with a preferred embodiment of the present invention. In this illustrative example, data table definition 700 includes person table 702, contact table 710, and address table 720.

Person table 702 has column FIRST_NAME 704 representing a person's first name, column LAST_NAME 706 representing a person's last name, and column DOB 708 representing a person's date of birth.

Contact table 710 has column type 712, which describes a type of contact, such as cell phone, home phone, or email address. Contact table 710 also includes detail 714, which describes the content of the contact type, for example, the actual phone number, website or email address.

Address table 720 includes street 722, street NR 724, house NR 726, town 728, zip 730, state province 732, and country 734. These columns together describe address information. Both contact table 710 and address table 720 have their own foreign key, such as Person ID 736 and 738. In addition, each table has its own primary key, such as ID 740, 742, and 744.

Turning now to FIG. 8, a diagram illustrating an exemplary XML schema format for representing database table definition, such as database table definition 700 in FIG. 7, using XML elements and attribute naming is depicted in accordance with an illustrative embodiment of the present invention. As depicted in FIG. 8, schema 800 includes three complex type elements, PERSON 802, CONTACT 804, and ADDRESS 806.

PERSON 802, CONTACT 804, and ADDRESS 806 are used to describe person table 702, contact table 710, and address table 720 in FIG. 7 respectively. PERSON 802 is represented by a complex type element, PERSON_T 808, which translates to a business object. In this example, PERSON_T 808 includes four simple type elements, ID 810, FIRST_NAME 812, LAST_NAME 814, and DOB 816. These elements describe columns FIRST_NAME 704, LAST_NAME 706, and DOB 708 in FIG. 7 respectively.

In addition to simple type elements, one may use complex type elements or element references to define foreign keys to other fields in other tables. For example, complex type element CONTACT_T 818 includes complex reference PERSON_ID 820, which describes foreign key PERSON_ID 738 in FIG. 7.

In addition to using complex type elements or element references, schema referential constraints may be used to define primary keys and fields. For example, key 822 may be used to define primary key ID 744 of person table 702 and keyref 824 may be used to define foreign key PERSON_ID 736 of address table 720. Thus, with schema 800, SQL ASI builder may populate both business object field names and ASI fields with matching element names. It is also noted that rather than using XML elements for simple types to define column names, XML attributes may be used. In addition, ID or IDREF may be used instead of schema keys and foreign keys.

Figure 9:
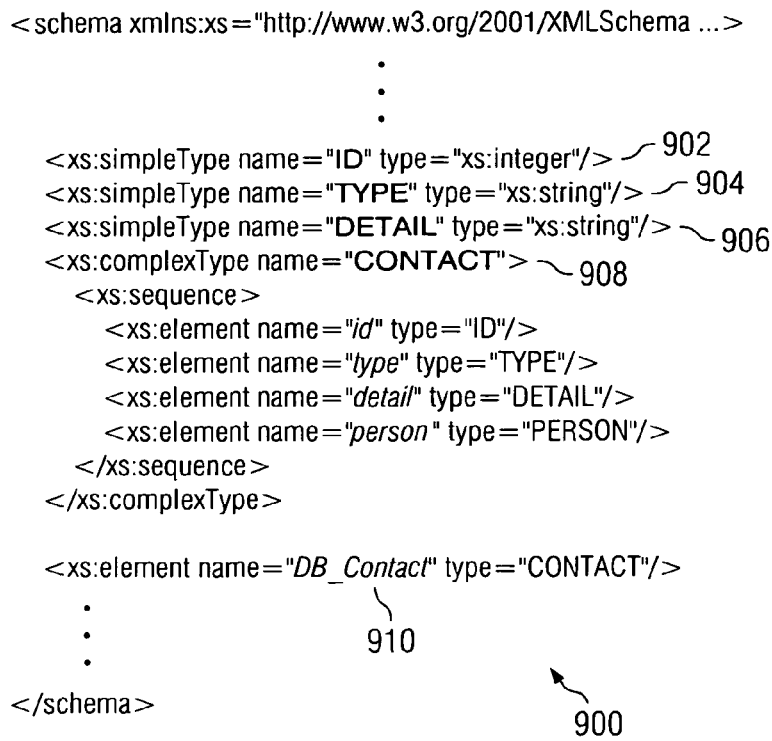
FIG. 9 is a diagram illustrating an exemplary XML schema format for representing database table definition, such as database table definition 700 in FIG. 7, using XML complex type and simple type naming in accordance with an illustrative embodiment of the present invention.

Turning now to FIG. 9, a diagram illustrating an exemplary XML schema format for representing database table definition, such as database table definition 700 in FIG. 7, using XML complex type and simple type naming is depicted in accordance with an illustrative embodiment of the present invention. As depicted in FIG. 9, instead of using XML element or attribute name to refer to table names and columns, complex type and simple type names are used to refer to database names. XML element and attribute names are now used for building business objects.

In this illustrative example, schema 900 includes simple type element ID 902, TYPE 904, and DETAIL 906. These elements describe ID 740, TYPE 712, and DETAIL 714 in FIG. 7. CONTACT 908 is a complex type element used to describe contact table 710 in FIG. 7.

It is possible that the naming of business objects might vary from given element names in order to observe possible naming conventions. Typically, application business object name has the application name prepended to the business object name. For example, element DB_Contact 910 has DB prepended to the business object name to define a database application.

Figure 10:
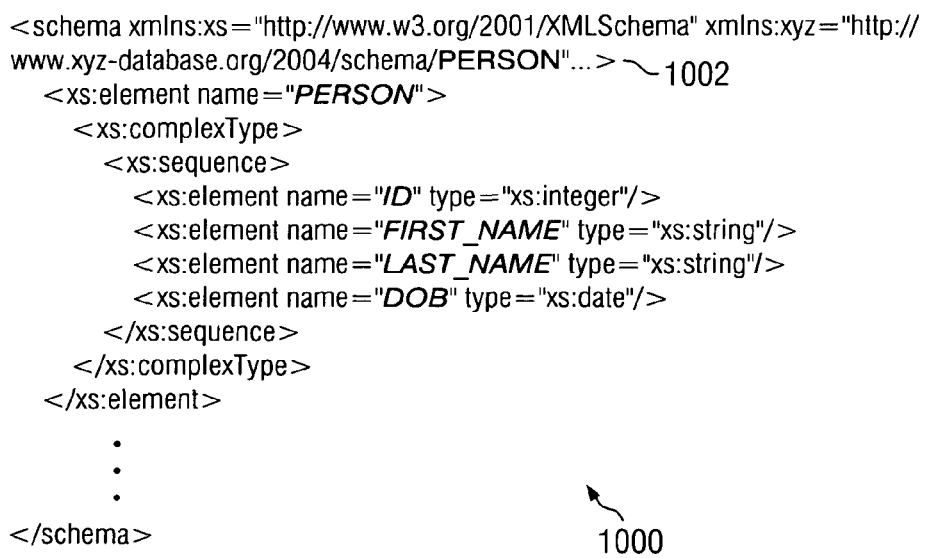
FIG. 10 is a diagram illustrating an exemplary XML schema format for representing database table definition, such as database table definition 700 in FIG. 7, using schema target namespace naming in accordance with an illustrative embodiment of the present invention.

Turning now to FIG. 10, a diagram illustrating an exemplary XML schema format for representing database table definition, such as database table definition 700 in FIG. 7, using schema target namespace naming is depicted in accordance with an illustrative embodiment of the present invention. As depicted in FIG. 10, schema 1000 is used to hold definition for one database table only. The target namespace holds part of or directly the database table name. For example, the target namespace of schema 1000 holds the database table name, PERSON 1002, which describes person table 702 in FIG. 7.

The column names may be described using any of the naming methods in FIGS. 8 and 9 and foreign references may be handled through importing schema definitions.

Turning now to FIG. 11, a diagram illustrating an exemplary XML schema format for representing database table definition, such as database table definition 700 in FIG. 7, using schema extension types is depicted in accordance with an illustrative embodiment of the present invention. As depicted in FIG. 11, schema 1100 declares database specific schema extensions to handle table and column names.

For example, xyz:column extension is used to describe database table columns ID 1102, FIRST_NAME 1104, LAST_NAME 1106, and DOB 1108. It is noted that schema extension may also introduce a database type hint or override that allows disambiguating type information if the schema simple types cannot clearly map to the database types.

Turning now to FIG. 12, a diagram illustrating an exemplary XML schema format for representing database table definition, such as database table definition 700 in FIG. 7, using schema appinfo annotation is depicted in accordance with an illustrative embodiment of the present invention. As depicted in FIG. 12, database table and column names may be conveyed using schema appinfo annotation. For example, schema 1200 uses appinfo column 1202 to describe database table column ID 1204.

Turning now to FIG. 13, a diagram illustrating an exemplary XML schema format for representing database table definition, such as database table definition 700 in FIG. 7, using schema comment annotation is depicted in accordance with an illustrative embodiment of the present invention. As depicted in FIG. 13, comments are used to pass meta information of the database definition.

For example, schema 1300 includes comment←col: ID→1302, which is used to pass column name ID with a given syntax. Similarly, comment←!col: FIRST_NAME→1304 is used to pass column name FIRST_NAME. Comment<!-table: PERSON→1306 is used to pass table name PERSON.

Figure 14:
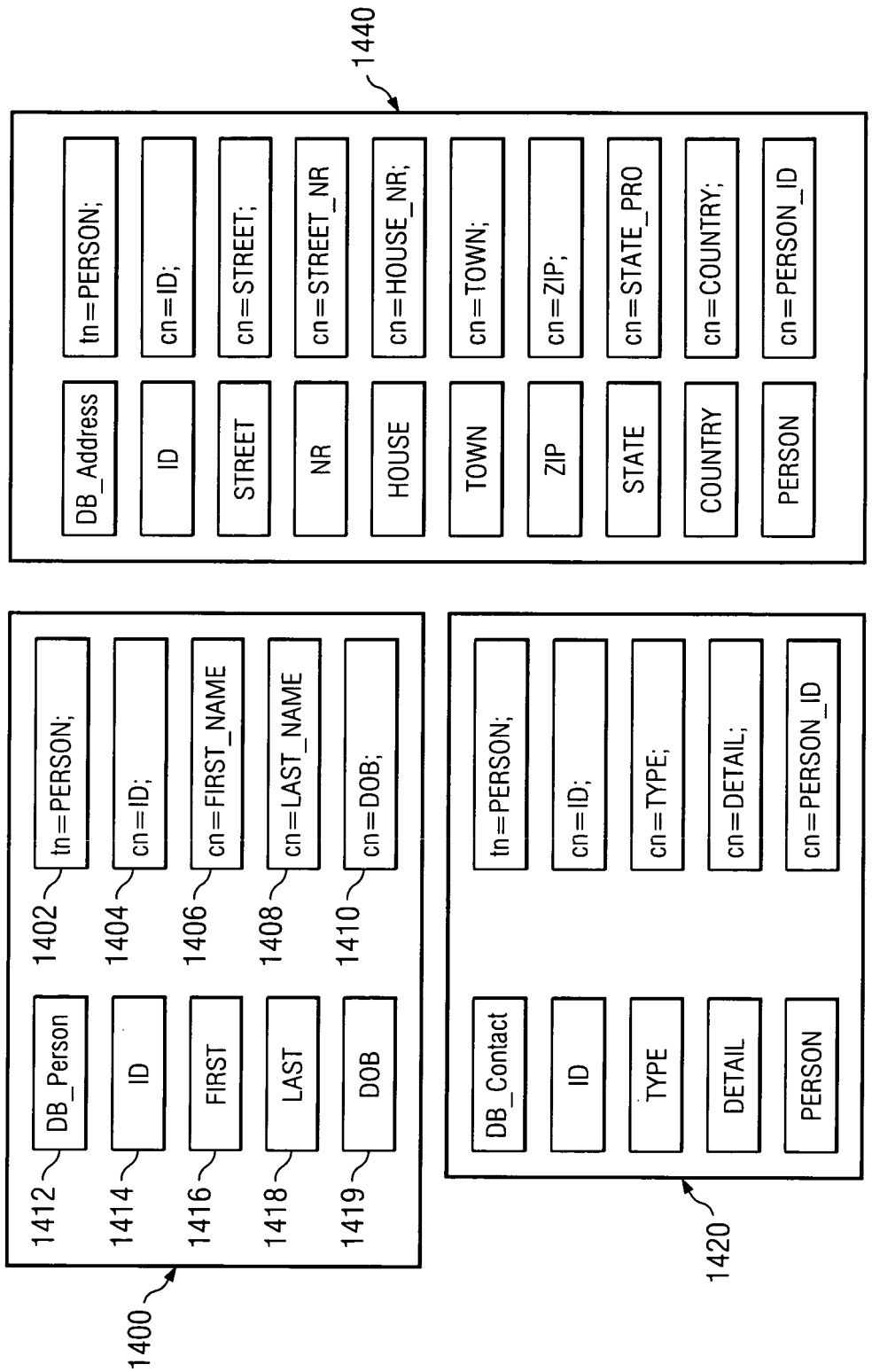
FIG. 14 is a diagram illustrating an exemplary application specific business object configured by the SQL ASI builder in accordance with an illustrative embodiment of the present invention.

Turning now to FIG. 14, a diagram illustrating an exemplary application specific business object configured by the SQL ASI builder is depicted in accordance with an illustrative embodiment of the present invention. As depicted in FIG. 14, SQL ASI builder configures meta BOs, such that it may represent database table definitions 702, 710, and 720 in FIG. 7.

In this illustrative example, business object 1400 is configured to represent person table 702 in FIG. 7. Business object 1400 includes business object level ASI fields, such as tn=PERSON 1402, and fields, such as cn=ID 1404, cn=FIRST_NAME 1406, cn=LAST_NAME 1408, and cn=DOB 1410. Business object 1400 also includes business object name, DB_Person 1412, and business object field names, such as id 1414, first 1416, last 1418, and dob 1419. Similarly, business object 1420 is configured to represent contact table 710 in FIG. 7 and business object 1440 is configured to represent address table 720 in FIG. 7.

Turning now to FIG. 15, a flowchart of an exemplary process of mapping SQL XML schema to application specific business objects is depicted in accordance with an illustrative embodiment of the present invention. As depicted in FIG. 15, the process begins when an operation to generate application specific business object from a SQL XML schema is invoked (step 1502).

Next, the schema resolver parses the SQL XML schema to generate meta business objects (BOs) holding references to source XML schema (step 1504). The BO ASI resolver then receives the schema and locates a SQL BO ASI builder that is able to handle the meta BOs (step 1506). Once a SQL BO ASI builder is located, the builder analyzes the schema annotation and fills the ASI fields for the meta BOs (step 1508). The ASI fields are understandable by SQL compliant application adapter.

The SQL BO ASI builder then returns the filled meta BOs to the BO ASI resolver (step 1510), and the BO ASI resolver sends the meta BOs to the BO writer, in order to write out business objects with application specific information that is understandable by the integration broker's SQL adapter, for example, the JDBC adapter (step 1512). Thus, the process terminates thereafter.

Thus, the present invention provides an improved mapping system to map SQL XML schema annotations to application specific business objects. The functionality of the BO ASI resolver is extended to locate a SQL BO ASI builder, from a plurality of registered BO ASI builders, that is able to handle a particular type of schema definition. In addition, the SQL BO ASI builder that is located may fill in ASI fields for the meta BOs. In this way, SQL XML schema may be automatically imported in the integration server and a variety of schema types may be accommodated regardless of database versions and vendors.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal-bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for mapping extensible markup language schema to application specific business objects in an integration application environment, the computer-implemented method comprising:

detecting the extensible markup language schema;
    generating a set of meta business objects from the schema, wherein the set of meta business objects includes metadata of the schema;
    responsive to the set of meta business objects being generated, identifying without user intervention, from a set of business object application specific builders, a business object application specific information builder that is able to interpret the schema based on an application type and version of the schema;
    using the identified business object application specific information builder to populate, without user intervention, a set of application specific information fields for the set of meta business objects based on the metadata of the schema, wherein the application specific information fields provides information used to configure a target application when the target application receives a given application specific business object that is specific to the target application; and
    generating a set of application specific business objects to be used by an adapter of the target application.

2. The computer-implemented method of claim 1, wherein the adapter comprises means for converting each application specific business object in the set of application specific business objects to an application specific data structure format that is compatible with the target application.

3. The computer-implemented method of claim 1, wherein the business object application specific information builder is specific to a type of schema definition.

4. The computer-implemented method of claim 1, wherein the set of application specific information fields provides a mapping between fields of the set of meta business objects to a set of fields in an application specific data structure of a database application, wherein the target application is the database application.

5. The computer-implemented method of claim 1, wherein the metadata of the schema includes annotations, elements, and attributes that represent database table names and database table columns.

6. The computer-implemented method of claim 1, wherein the detecting step and generating step are performed by a schema resolver, wherein the identifying step is performed by a business object application specific information resolver, and wherein the populating step is performed by the identified business object application specific information builder.

7. The computer-implemented method of claim 1, wherein the set of application specific information fields is understandable by a structure query language compliant application adapter, wherein the adapter comprises means for converting each application specific business object in the set of application specific business objects to an application specific data structure format that is compatible with the target application.

8. The computer-implemented method of claim 1, wherein the application specific business objects include database information and do not contain schema information that describe structure and content of business objects.

9. The computer-implemented method of claim 1, wherein the schema is annotated structured query language (SQL) extensible markup language (XML) schema that describes SQL tables of an SQL database, wherein the application specific business objects are SQL business objects for an SQL database application, which is the target application, and wherein the SQL business objects are formed without accessing the SQL database containing the SQL tables.

10. The computer-implemented method of claim 5, wherein the annotations, elements, and attributes represent the database table names and the database table columns by using one of a markup language element and attribute naming, a markup language complex type and simple type naming, a schema target namespace naming, schema extension types, schema appinfo annotations, and schema comment annotations.

11. The computer-implemented method of claim 10, wherein the markup language element and attribute naming relates the database table names to complex type elements, and the database table columns to simple type elements.

12. The computer-implemented method of claim 11, wherein the markup language element and attribute naming relates database table foreign key columns to complex type elements, primary keys to key referential constraint, and foreign keys to key referential constraint.

13. The computer-implemented method of claim 10, wherein the markup language complex type and simple type naming relates the database table names to complex type names, and the database table columns to simple type names.

14. The computer-implemented method of claim 10, wherein the schema target namespace naming relates a database table name to a target namespace of the schema.

15. The computer-implemented method of claim 10, wherein the schema extension types relate the database table names to database table specific schema extensions, and the database table columns to database column specific schema extensions.

16. The computer-implemented method of claim 10, wherein the schema appinfo annotations relate appinfo table annotations to the database table names and appinfo column annotations to the database table columns.

17. The computer-implemented method of claim 10, wherein the schema comment annotations relate table comments to the database table names, and column comments to the database table columns.

18. A data processing system comprising:
 a bus;
 a memory connected to the bus, wherein a set of instructions are located in the memory; and
 a processor connected to the bus, wherein the processor executes the set of instructions for a schema resolver to detect a extensible markup language schema, generate a set of meta business objects from the schema, wherein the set of meta business objects includes metadata of the schema, identify without user intervention, from a set of business object application specific builders, a business object application specific information builder that is able to interpret the schema based on an application type and version of the schema; using the identified business object application specific information builder to populate, without user intervention, a set of application specific information fields for the set of meta business objects based on the metadata of the schema, wherein the application specific information fields provides information used to configure a target application when the target application receives a given application specific business object that is specific to the target application, and generate a set of application specific business objects usable by an adapter of the target application.

19. The data processing system of claim 18, wherein the metadata includes annotations, elements, and attributes representing database table names and database columns.

20. The data processing system of claim 18, wherein the adapter comprises means for converting each application specific business object in the set of application specific business objects to an application specific data structure format that is compatible with the target application.

21. A computer readable, recordable-type medium encoded with a computer program product that is operable with a data processing system for mapping extensible markup language schema to application specific business objects in an integrated application environment, the computer program product comprising:
 first instructions for detecting the extensible markup language schema;
 second instructions for generating a set of meta business objects from the schema, wherein the set of meta business objects includes metadata of the schema;
 third instructions, responsive to the second instructions, for identifying without user intervention, from a set of business object application specific builders, a business object application specific information builder that is able to interpret the schema based on an application type and version of the schema;
 fourth instructions for using the identified business object application specific information builder to populate, without user intervention, a set of application specific information fields for the set of meta business objects based on the metadata of the schema, wherein the application specific information fields provides information used to configure a target application when the target application receives a given application specific business object that is specific to the target application; and
 fifth instructions for generating a set of application specific business objects usable by an adapter of the target application.

22. The computer program product of claim 21,
 wherein the adapter comprises means for converting each application specific business object in the set of application specific business objects to an application specific data structure format that is compatible with the target application.

* * * * *